(12) United States Patent
Covell et al.

(10) Patent No.: US 7,158,656 B2
(45) Date of Patent: Jan. 2, 2007

(54) THREE DIMENSIONAL OBJECT POSE ESTIMATION WHICH EMPLOYS DENSE DEPTH INFORMATION

(75) Inventors: Michele M. Covell, Los Altos Hills, CA (US); Michael Hongmai Lin, Stanford, CA (US); Ali Rahimi, Belmont, CA (US); Michael Harville, Palo Alto, CA (US); Trevor J. Darrell, San Francisco, CA (US); John I. Woodfill, Palo Alto, CA (US); Harlyn Baker, Los Altos, CA (US); Gaile G. Gordon, Palo Alto, CA (US)

(73) Assignee: Vulcan Patents LLC, Seattle, WA (US)

( * ) Notice: Subject to any disclaimer, the term of this patent is extended or adjusted under 35 U.S.C. 154(b) by 0 days.

(21) Appl. No.: 11/195,039

(22) Filed: Aug. 1, 2005

(65) Prior Publication Data

US 2005/0265583 A1 Dec. 1, 2005

Related U.S. Application Data

(63) Continuation of application No. 09/520,964, filed on Mar. 8, 2000, now Pat. No. 7,003,134.

(60) Provisional application No. 60/123,329, filed on Mar. 8, 1999, provisional application No. 60/124,158, filed on Mar. 10, 1999.

(51) Int. Cl.
*G06K 9/00* (2006.01)

(52) U.S. Cl. .................... 382/106; 382/103; 382/107; 348/139

(58) Field of Classification Search .............. None
See application file for complete search history.

(56) References Cited

U.S. PATENT DOCUMENTS 5,036,474 A 7/1991 Bhanu et al.

(Continued)

OTHER PUBLICATIONS

Bregler, Christoph, et al. *Tracking People with Twists and Exponential Maps*, Computer Science Division, U.S. Berkeley, 8 pages.

(Continued)

*Primary Examiner*—Bhavesh M. Mehta
*Assistant Examiner*—Christopher Lavin
(74) *Attorney, Agent, or Firm*—Van Pelt, Yi & James LLP

(57) ABSTRACT

Dense range data obtained at real-time rates is employed to estimate the pose of an articulated figure. In one approach, the range data is used in combination with a model of connected patches. Each patch is the planar convex hull of two circles, and a recursive procedure is carried out to determine an estimate of pose which most closely correlates to the range data. In another aspect of the invention, the dense range data is used in conjunction with image intensity information to improve pose tracking performance. The range information is used to determine the shape of an object, rather than assume a generic model or estimate structure from motion. In this aspect of the invention, a depth constraint equation, which is a counterpart to the classic brightness change constraint equation, is employed. Both constraints are used to jointly solve for motion estimates.

20 Claims, 3 Drawing Sheets

U.S. PATENT DOCUMENTS

| | | | |
|---|---|---|---|
| 5,128,874 | A | 7/1992 | Bhanu et al. |
| 5,307,170 | A | 4/1994 | Itsumi et al. |
| 5,521,633 | A | 5/1996 | Nakajima et al. |
| 5,675,377 | A | 10/1997 | Gibas |
| 5,692,061 | A | 11/1997 | Sasada et al. |
| 6,084,979 | A | 7/2000 | Kanade et al. |
| 6,195,445 | B1 | 2/2001 | Dubuisson-Jolly et al. |
| 6,445,819 | B1 | 9/2002 | Darrell et al. |
| 6,466,684 | B1 * | 10/2002 | Sasaki et al. ............... 382/104 |
| 6,492,986 | B1 | 12/2002 | Metaxas et al. |

OTHER PUBLICATIONS

Murray, R. et al., *Chapter 2, Rigid Body Motion*, A Mathematical Introduction to Robotic Manipulation, CRC Press, Boca Raton, 1994, pp. 19-30, 34-61, 85-87, 115-117.

Pentland, Alex et al, *Recovery of Nonrigid Motion and Structure*, IEEE Transactions Of Pattern Analysis And Machine Intelligence, vol. 13, No. 7, Jul. 1991, pp. 730-742.

Yamamoto, Masanobu et al. *Incremental Tracking of Human Actions from Multiple Views*, 1998 IEEE, Department of Information Engineering, Niigata University, pp. 2-7.

Aggarwal, J.K.; Cai, Q.; *Human Motion Analysis; A Review*, Nonrigid and Articulated Motion Workshop, 1997. Proceedings., IEEE, Jun. 16, 1997, pp. 90-102.

B. Sabata, J. Aggarwal. *Estimation of Motion from a Pair of Range Images: A Review*. CVGIP, 54(3): 309-324, Nov. 1991.

Michael J. Black & Yaser Yacoob; *Tracking and Recognizing Rigid and Non- Rigid Facial Motions Using Local Parametric Models of Image Motion*; Xerox Palo Alto Research Center & Computer Vision Laboratory.

Michael H. Lin; *Tracking Articulated Objects in Real-Time Range Image Sequences*; Interval Research Corporation.

Sumit Basu, Irfan Essa, & Alex Pentland; *Motion Regularization for Model-Based Head Tracking*; Massachusetts Institute of Technology, Perceptual Computing Section.

D.M. Gavrila & L.S. Davis; *3-D Model-Based Tracking of Humans in Action: A Multi-View Approach*; University of Maryland, Computer Vision Laboratory, cfar.

John Woodfill & Brian Von Herzen; *Real-Time Stereo Vision on the Parts Reconfigurable Computer*; Interval Research Corporation & Rapid Prototypes, Inc.

James R. Bergen, P. Anandan, Keith J. Hanna, & Rajesh Hingorani; *Hierarchical Model-Based Motion Estimation*; May 19-22, 1992; Computer Vision ECCV '92; Second European Conference on Computer Vision.

Berthold K.P. Horn & E.J. Weldon Jr.; *Direct Methods for Recovering Motion*; 1998; International Journal of Computer Vision 2, p. 51-76.

Ramin Zabih & John Woodfill; *Non-Parametric Local Transforms for Computing Visual Correspondence*; May 2-6, 1994; Computer Vision ECCV '94; Third European Conference on Computer Vision.

Sharma et al. *Dynamic Control of Motion Detection by an active, mobile observer*, Intelligent Control, 1991. Proceedings of IEEE International Symposium on Aug. 13-15, 1991 pp. 43-48.

* cited by examiner

THREE DIMENSIONAL OBJECT POSE ESTIMATION WHICH EMPLOYS DENSE DEPTH INFORMATION

This is a Continuation of application Ser. No. 09/520,964, filed Mar. 8, 2000, now U.S. Pat. No. 7,003,134 which is hereby incorporated by reference for all purposes. This application claims the benefit of U.S. Provisional Application No. 60/123,329, filed Mar. 8, 1999 and U.S. Provisional Application No. 60/124,158, filed Mar. 10, 1999, both of which are incorporated herein by reference for all purposes.

FIELD OF THE INVENTION

The present invention is generally directed to the field of computer vision, and more particularly to the automatic estimation and tracking of the pose, i.e., position and/or orientation, of an object within a video image.

BACKGROUND OF THE INVENTION

The ability to accurately estimate the three-dimensional position and orientation of an object, based solely upon video images of the object, is of increasing interest in the field of computer vision. For example, interactive human interface applications require the ability to quickly and accurately track the pose of a user. Information regarding the user's body position must be at or near real-time, to adjust the display of the interface in a meaningful, timely manner. For instance, an application which displays a three-dimensional view of an object requires accurate tracking of the position and orientation of the user's head, in order to present the frames containing an image of the object from an appropriate perspective.

In general, previous approaches to pose tracking often relied on assumed models of shape, to track motion in three dimensions from intensity data, i.e., image brightness. Other approaches have employed depth data in conjunction with the image brightness information to estimate pose. Direct parametric motion has also been explored for both rigid and affine models. In this approach, it is preferable to utilize constraints in the analysis of the image data, to reduce the number of computations that are required to estimate the pose of a figure. A comprehensive description of brightness constraints that are implied by the rigid motion of an object was presented by Horn and Weldon, "Direct Methods for Recovering Motion", *International Journal of Computer Vision* 2:51–76 (1998). Image stabilization and object tracking using an affine model with direct image intensity constraints is described in Bergen et al., "Hierarchical Model-Based Motion Estimation", *European Conference on Computer Vision*, pages 237–252 (1992). This reference discloses the use of a coarse-to-fine algorithm to solve for large motions.

The application of affine models to track the motion of a user's head, as well as the use of non-rigid models to capture expression, is described in Black and Yacoob, "Tracking and Recognizing Rigid and Non-Rigid Facial Motions Using Local Parametric Models of Image Motion," *International Conference on Computer Vision* (1995). This paper describes the use of a planar face-shape for tracking gross head motion, which limits the accuracy and range of motion that can be captured. A similar approach, using ellipsoidal shape models and perspective projection, is described in Basu et al., "Motion Regularization for Model-Based Head Tracking", *International Conference on Pattern Recognition* (1996). The method described in this publication utilizes a pre-computed optic flow representation, instead of direct brightness constraints. It explicitly recovers rigid motion parameters, rather than an affine motion in the image plane. Rigid motion is represented using Eular angles, which can pose certain difficulties at singularities.

The tracking of articulated-body motion presents additional complexities within the general field of pose estimation. A variety of different techniques have been proposed for this particular problem. Some approaches use constraints from widely separated views to disambiguate partially occluded motions, without computing depth values. Examples of these approaches are described, for example, in Yamamoto et al., "Incremental Tracking of Human Actions From Multiple Views", *Proc. IEEE CVPR*, pages 2–7, Santa Barbara, Calif. (1998), and Gavrila and Davis, "3D Model-Based Tracking of Humans in Action: A Multi-View Approach", *Proc. CVPR*, pages 73–80, San Francisco, Calif. (June 1996).

The use of a twist representation for rigid motion, which is more stable and efficient to compute, is described in Bregler and Malik, "Tracking People With Twists and Exponential Maps", Proceedings of the IEEE Computer Society Conference on Computer Vision and Pattern Recognition, Santa Barbara, Calif. (June 1998). This approach is especially suited to the estimation of chained articulated motion. The estimation of twist parameters is expressed directly in terms of an image brightness constraint with a scaled orthographic projection model. It assumes a generic ellipsoidal model of object shape. To recover motion and depth, constraints from articulation and information from multiple widely-spaced camera views is used. This method is not able to estimate the rigid translation in depth of an unconnected object, given a single view.

The techniques which exhibit the most robustness tend to fit the observed motion data to a parametric model before assigning specific pointwise correspondences between successive images. Typically, this approach results in non-linear constraint equations which must be solved using iterative gradient descent or relaxation methods, as described in Pentland and Horowitz, "Recovery of Non-Rigid Motion and Structure", *PAMI,* 13(7), pp. 730–742 (July 1991), and Lin, "Tracking Articulated Objects in Real-Time Range Image Sequences", *Proc. IEEE ICCV*, Volume 1, pages 648–653, Greece (September 1999). The papers by Bregler et al. and Yamamoto et al. provide notable exceptions to this general trend. Both result in systems with linear constraint equations, that are created by combining articulated-body models with dense optical flow.

In the approach suggested by Yamamoto et al., the constraints between limbs are maintained by sequentially estimating the motion of each parent limb, adjusting the hypothesized position of a child limb, and then estimating the further motion of the child limb. This approach is conceptually simpler than the one suggested by Bregler et al., but results in fewer constraints on the motion of the parent limbs. In contrast, the method of Bregler et al. takes full advantage of the information provided by child limbs, to further constrain the estimated motions of the parents.

Both Yamamoto et al. and Bregler et al. use a first-order Taylor series approximation to the camera-body rotation matrix, to reduce the number of parameters that are used to represent this matrix. Furthermore, both use an articulated model to generate depth values that are needed to linearize the mapping from three-dimensional body motions to observe two-dimensional camera-plane motions.

The various techniques which employ depth information to estimate pose have typically utilized sparse depth data, e.g. representative sample points in an image. Recent imaging techniques now make it possible to obtain dense depth information, e.g. a depth value for all, or almost all, of the pixels in an image. Furthermore, this data can be obtained at video rates, so that it is real-time, or near real-time. It is an objective of the present invention to provide techniques for estimating pose which employ dense depth data.

SUMMARY OF THE INVENTION

In accordance with one aspect of the present invention, dense depth data that is obtained at real-time rates is employed to estimate the pose of an articulated figure, using a model of connected patches. In another aspect of the invention, the dense depth data is used in conjunction with image intensity information to improve pose tracking performance. The range information is used to determine the shape of an object, rather than assume a generic model or estimate structure from motion. The shape data can be updated with each frame, offering a more accurate representation across time than one which is provided by an initial, or off-line, range scan. In accordance with this feature of the invention, a depth constraint equation, which is a counterpart to the classic brightness change constraint equation, is employed. Both constraints are used to jointly solve for motion estimates.

By observing the change in depth directly, rather than inferring it from intensity change over time, more accurate estimates of object motion can be obtained, particularly for rotation out of the image plane and translation in depth. Depth information is also less sensitive to illumination and shading effects than intensity data as an object translates and rotates through space. Hence, the dense depth data is frequently more reliable than the brightness information.

In the case of articulated joints, twist mathematics are used to capture the motion constraints. Unlike previous approaches, a first-order Taylor series expansion is not employed to approximate the body-rotation matrix. Rather, this approximation is achieved by solving the constraints on a transformed parameter set, and remapping the results into the original parameter set using a closed-form non-linear function.

As a further feature of the invention, the brightness change constraint equation and the depth change constraint equation are re-derived, using shifted foci of expansions. This extension permits the constraints to be used on large motions without iteration. The constraint matrices are also modified to decouple the updates of body rotation and body translation from one another.

These and other features of the invention are described in greater detail hereinafter, with reference to various examples that are illustrated with the assistance of the accompanying figures.

DETAILED DESCRIPTION

To facilitate an understanding of the invention, it is described hereinafter with reference to its application in the context of estimating and tracking the pose of an articulated object, such as the human body, since this example presents a particularly interesting and useful application of the invention. It will be appreciated, however, that the practical utility of the invention is not limited to this particular situation. Rather, the invention can be employed with success in a variety of different situations, such as the estimation of the pose of singular rigid objects.

In the implementation of the invention, the pose of a figure is estimated by determining a reference, or initial pose, and then tracking changes over successive images to obtain an updated estimate of the pose. In the context of the following description, the term "pose" is employed in a generic sense, to indicate either or both of the position of the object within a three-dimensional space, and the orientation of the object at that position, e.g., the rotational position of the object, or individual components of the object, relative to three orthogonal axes. In other words, the term "pose" encompasses motion in any or all of six degrees of freedom, namely translation along three orthogonal axes and rotation about three orthogonal axes. It will be appreciated that the invention can be applied to estimate only the position of the object, without regard to its orientation, or only the orientation of the object, without regard to its global position.

Figure 1:
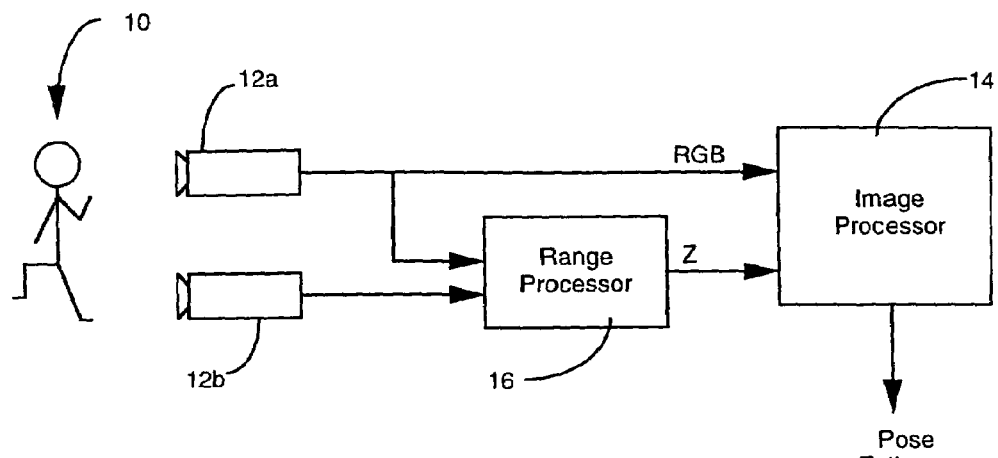
FIG. 1 is a schematic illustration of a pose estimation system in which the present invention can be employed.

FIG. 1 schematically illustrates one example of a pose estimation system in which the present invention can be implemented. An object whose pose is to be estimated and tracked, such as a human body 10, is located within the field of view of a pair of spaced video cameras 12a and 12b, which provide a sequence of stereo images of the object. One of the cameras, e.g., camera 12a, is designated as a reference, or master, camera. Data describing the intensity of each of the pixels in the image sensed by this camera is provided to an image processor 14. The image data from both of the cameras is provided to a range processor 16. The range processor computes the distance of each point on the object from a reference position, such as the image plane of the reference camera, and provides this information to the image processor 14. In general, each point on the object corresponds to a pixel within the image sensed by the reference camera. In a preferred embodiment of the invention, the stereo pair of cameras and the range processor 16 constitute a video-rate range sensor of the type described in Woodfill and Von Herzen, "Real-Time Stereo Vision on the PARTS Reconfigurable Computer", *Proceedings IEEE Symposium on Field-Programmable Custom Computing Machines*, Napa, Calif., pages 242–250 (April 1997). In this type of system, the correspondence between pixels in the respective images from the two cameras 12a and 12b is computed according to the census algorithm, as described in detail in Zabih and Woodfill, "Non-Parametric Local Transforms for Computing Visual Correspondence", *Proceedings of the Third European Conference on Computer Vision*, Stockholm, pages 151–158, May 1994. The disclosures of both of these publications are incorporated herein by reference. The output of such a system comprises a depth value for each pixel in the image from the reference camera 12a, together with a confidence factor for the value.

The range information which is provided by such a system is dense data. In the context of the present invention, "dense" data is understood to mean data obtained from a predefined, fixed sampling grid that is independent of the parameter being determined, such as the pose of the figure. In a preferred implementation of the invention, the sample grid comprises the array of pixels on the image sensing device, e.g. CCD, of the camera. In this case, each pixel provides one sample of depth data. Rather than employ the data from every pixel, it is also possible to obtain depth data with a different resolution by means of a coarser, but regular, sampling grid that is established a priori, e.g. every 2nd pixel, every 5th pixel, etc. The data is also dense in the temporal sense, i.e. it is obtained at a regular sampling interval, such as a video frame rate.

Within the image processor 14, frame-to-frame changes in the image intensity and/or depth information are used to track the motion of the object and thereby estimate its pose. Three-dimensional motion of each point in space induces a corresponding two-dimensional motion of the projection of that point onto the image plane of the camera. In accordance with the invention, two different approaches are employed to estimate the pose from the camera outputs. One approach utilizes the range data alone, and employs a shape model to determine the figure's pose. In the other approach, both brightness information and range data are employed, without reference to a shape model. The pose estimate is obtained by computing the velocity of each point on the object from frame to frame. In the following description, capital letters are employed to represent parameter values in the three-dimensional space, and lower case values are employed for the corresponding parameters in the two-dimensional image plane. Hence, the coordinates of a point in three-dimensional space is expressed as $[X,Y,Z]$, and its corresponding point in the camera image plane is identified as $[x,y]$.

Before describing the manner in which dense depth data is employed to estimate pose in accordance with the invention, a background discussion of the use of brightness data in the image processor 14 is presented. The velocity of a point in the video image is computed in accordance with a standard brightness change constraint equation for image velocity estimation. This equation arises from the assumption that intensities undergo only local translations from one frame to the next in an image sequence. This assumption does not hold true for all points in the image, however, since it ignores phenomena such as object self-occlusion, i.e., a portion of the object disappears from view as it rotates away from the camera, and changes in intensity due to changes in lighting, e.g., the object moves into a shadow.

The brightness change constraint equation can be expressed as follows, for image frames at times t and t+1:

$$B(x,y,t+1) = B(x-v_x, y-v_y, t) \quad (1)$$

where $B(x,y,t)$ is the image brightness, or intensity, at time t, and $v_x$ and $v_y$ are the motions in X and Y, after projection onto the image plane. If it is assumed that the time-varying image intensity is well approximated by a first-order Taylor series expansion, the right side of Equation 1 can be expanded to obtain:

$$B(x,y,t+1) = B(x,y,t) - v_x B_x(x,y,t) - v_y B_y(x,y,t) \quad (2)$$

where $B_x(x,y,t)$ and $B_y(x,y,t)$ are image intensity gradients with respect to x and y as a function of space and time.

Rearranging these terms into matrix form yields a commonly employed gradient formulation of the brightness change constraint equation:

$$-B_t = [B_x \quad B_y]\begin{bmatrix} v_x \\ v_y \end{bmatrix} \quad (3)$$

This equation can be used to estimate image plane velocities, but 3-D real-world velocities are desired. For a perspective camera with focal length f, the relationship between the two sets of velocities may be derived from the perspective camera projection equations $$x = \frac{fX}{Z}, \text{ and } y = \frac{fY}{Z}.$$

Taking the derivatives of these equations with respect to time yields $$v_x = \frac{dx}{dt} = \frac{f}{Z}V_X - \frac{x}{Z}V_Z \quad (4)$$

$$v_y = \frac{dy}{dt} = \frac{f}{Z}V_Y - \frac{y}{Z}V_Z$$

This can be written in matrix form as $$\begin{bmatrix} v_x \\ v_y \end{bmatrix} = \frac{1}{Z}\begin{bmatrix} f & 0 & -x \\ 0 & f & -y \end{bmatrix}\begin{bmatrix} V_X \\ V_Y \\ V_Z \end{bmatrix} \quad (5)$$

The right side of the above equation can be substituted into Equation 3 to obtain the constraint equation in terms of 3-D object velocities:

$$-B_t = \frac{1}{Z}[B_x \quad B_y]\begin{bmatrix} f & 0 & -x \\ 0 & f & -y \end{bmatrix}\vec{V} \quad (6)$$

$$= \frac{1}{Z}[fB_x \quad fB_y \quad -(xB_x + yB_y)]\vec{V}$$

where $\vec{V} = [V_X \ V_Y \ V_Z]^T$. The 3-D object velocities $\vec{V}$ are then further constrained according to rigid body object motion. Any rigid body motion can be expressed in terms of the instantaneous object translation $\vec{P} = [P_X P_Y P_Z]^T$ and the instantaneous rotation of the object about an axis $\vec{\Omega} = [\omega_X \ \omega_Y \ \omega_Z]^T$. $\vec{\Omega}$ describes the orientation of the axis of rotation, and $|\vec{\Omega}|$ is the magnitude of rotation per unit time. For small rotations, $$\vec{V} = \vec{T} + \vec{\Omega} \times \vec{X} = \vec{T} - \vec{X} \times \vec{\Omega} \quad (7)$$

The cross-product of two vectors may be rewritten as the product of a skew-symmetric matrix and a vector. Applying this to the cross product $\vec{X} \times \vec{\Omega}$ results in:

$$\vec{X} \times \vec{\Omega} = \hat{X}\vec{\Omega}, \text{ where } \hat{X} = \begin{bmatrix} 0 & -Z & Y \\ Z & 0 & -X \\ -Y & X & 0 \end{bmatrix}$$

Equation 7 can be rearranged into the convenient matrix form $$\vec{V} = Q\vec{\phi} \qquad (8)$$

by defining the motion parameter vector $\phi$ as $[\vec{T} \ \vec{\Omega}]^T$, and defining the matrix $$Q = [I \ -\hat{X}] = \begin{bmatrix} 1 & 0 & 0 & 0 & Z & -Y \\ 0 & 1 & 1 & -Z & 0 & X \\ 0 & 0 & 1 & Y & -X & 0 \end{bmatrix} \qquad (9)$$

The Q matrix may also be written in terms of image x and y coordinates, instead of 3-D world X and Y coordinates, in order to be consistent with the constraint equation as derived thus far:

$$Q = \begin{bmatrix} 1 & 0 & 0 & 0 & Z & \frac{-Zy}{f} \\ 0 & 1 & 0 & -Z & 0 & \frac{Zx}{f} \\ 0 & 0 & 1 & \frac{Zy}{f} & \frac{-Zx}{f} & 0 \end{bmatrix} \qquad (10)$$

Using either form of Q, substitution of the right side of Equation 8 for $\vec{V}$ in Equation 6 produces a single linear equation relating image intensity derivatives to rigid body motion parameters under perspective projection at a single pixel:

$$-B_t = \frac{1}{Z}[fB_x \ fB_y \ -(xB_x + yB_y)]Q\vec{\phi} \qquad (11)$$

Since video-rate depth information is available via the range processor 16, in accordance with the present invention changes in the depth image over time can be related to rigid body motion in a manner similar to that shown for intensity information above, and employed in the image processor 14 to estimate pose. For rigid bodies, an object point which appears at a particular image location (x, y) at time t will appear at location (x+$v_x$, y+$v_y$) at time t+1. The depth values at these corresponding locations in image space and time should therefore be the same, except for any depth translation the object point undergoes between the two frames. This can be expressed in a form similar to Equation 1:

$$Z(x,y,t) + V_z(x,y,t) = Z(x+v_x(x,y,t), y+v_y(x,y,t), t+1) \qquad (12)$$

The same series of steps described above for deriving the brightness constraint on rigid body motion can now be used to derive an analogous linear depth change constraint equation on rigid body motion. First-order Taylor series expansion, followed by rearrangement into matrix form, produces $$-Z_t = [Z_x \ Z_y]\begin{bmatrix} v_x \\ v_y \end{bmatrix} - V_Z \qquad (13)$$

Use of perspective camera projection to relate image velocities to 3-D world velocities yields $$-Z_t = \frac{1}{Z}[Z_x \ Z_y]\begin{bmatrix} f & 0 & -x \\ 0 & f & -y \end{bmatrix}\vec{V} - V_Z \qquad (14)$$

$$= \frac{1}{Z}[fZ_x \ fZ_y \ -(Z+xZ_x+yZ_y)]\vec{V}$$

Finally, 3-D world velocities are constrained to rigid body motion by introducing the Q matrix $$-Z_t = \frac{1}{Z}[fZ_x \ fZ_y \ -(Z+xZ_x+yZ_y)]Q\vec{\phi} \qquad (15)$$

This linear equation for relating depth gradient measurements to rigid body motion parameters at a single pixel is the depth analog to Equation 11.

In many applications, it is possible to approximate the camera projection model as orthographic instead of perspective without introducing significant error in 3-D world coordinate estimation. For pose tracking algorithms, use of orthographic projection simplifies the constraint equations derived previously, making the solution of linear systems of these equations much less computationally intensive.

To derive the orthographic analogs of Equations 11 and 15, the perspective projection relationship is replaced with the orthographic projection equations x=X and y=Y, which in turn imply that $v_x=V_x$ and $v_y=V_y$. Hence, Equation 5 is replaced by the simpler equation $$\begin{bmatrix} v_x \\ v_y \end{bmatrix} = \begin{bmatrix} 1 & 0 & 0 \\ 0 & 1 & 0 \end{bmatrix}\vec{V} \qquad (16)$$

Proceeding through the remainder of the derivation of Equation 11 yields its orthographic projection analog:

$$-B_t = [B_x \ B_y \ 0]\Omega\vec{\phi} \qquad (17)$$

Similar modification to the derivation of the depth change produces the orthographic counterpart to Equation 15:

$$-Z_t = [Z_x \ Z_y \ -1]Q\vec{\phi} \qquad (18)$$

At each time step, registered intensity and depth images are obtained. Intensity and depth gradients are computed with respect to image coordinates x and y, and with respect to time, at each pixel location. Intensity and depth constraint equations of the form of (11) and (15) can be written for each pixel location. Because the intensity constraint equations (11) are linear, they can be combined across N pixels by stacking the equations in matrix form: $H_I\vec{\phi}_I = \vec{b}_I$.

$H_I \in \Re^{N \times 6}$, where each row is the vector obtained by multiplying out the right side of Equation 12 at a single pixel i. $\vec{b}_I \in \Re^{N \times 1}$, where the ith element is $-B_t$ at pixel i. The I subscripts on the variables indicate that they reflect only the use of intensity constraints. Provided that N>6, this system of linear equations will over-constrain the motion parameters $\vec{\phi}_I$ so that they can be solved by the least-squares method:

$$\vec{\phi}_I = (H_I^T H_I)^{-1} H_I^T \vec{b}_I \qquad (19)$$

The linear depth constraint equations can be combined similarly across N pixels to form the linear system $H_D \vec{\phi}_D = \vec{b}_D$, where $H_D \in \Re^{N \times 6}$, $\vec{b}_z \in \Re^{N \times 1}$, and the elements of $H_D$ and $\vec{b}_D$ are derived from Equation 15 in a manner analogous to that explained for the intensity linear system above. The D subscripts on the variables indicate that they reflect only the use of depth constraints. Provided that N>6, the motion parameters $\vec{\phi}_D$ can be solved according to the least-squares method, as in Equation 19.

The intensity and depth linear systems can be combined into a single linear system for constraining the motion parameters $\vec{\phi}$: $H\vec{\phi} = \vec{b}$, where $H = [H_I \lambda H_D]^T$, and $\vec{b} = \vec{b} = [\vec{b}_I \lambda \vec{b}_D]^T$.

The scaling factor, $\lambda$, provides control over the weighting of depth constraints relative to intensity constraints. In cases where depth can be expected to be more reliable than intensity, such as under fast-changing lighting conditions, it is preferable to set $\lambda$ to a value higher than 1, but under other conditions, such as when depth information is much noisier than intensity, lower $\lambda$ values are preferably used. The least-squares solution to the above equation is $$\vec{\phi} = -(H^T H)^{-1} H^T \vec{b} \qquad (20)$$

To estimate the motion of an object, it is preferable to combine the constraint equations only across pixel locations which correspond to the object, and for which intensity, depth, and their derivatives are well-defined. To do this, a support map $w(x,y) \in [0,1]$ is used which indicates the probability that each pixel corresponds to the object of interest and that its measurements and derivatives are reliable. The least-squares solution is modified to weight the contribution of the constraint from pixel location (x,y) according to w(x,y):

$$\vec{\phi} = -(H^T W^T W H)^{-1} H^T W^T \vec{b} \qquad (21)$$

$W \in \Re^{N \times N}$ is a diagonal matrix whose entry $W(i,i) = w(x_i, y_i)$. If a binary support map is used, i.e., all values of w(x,y) are either 0 or 1, the W matrix can be omitted, and H and $\vec{b}$ are removed from all rows corresponding to pixels i for which $w(x_i, y_i) = 0$. A support map may also be applied in similar fashion when solving for motion parameters using depth or intensity constraints only. The three support maps for these different constraint combinations do not need to be the same.

The motions estimated between individual pairs of frames are added together to form an estimate of cumulative object motion over time. It may be beneficial to supplement this tracking technique with another algorithm for determining when motion estimation has accumulated substantial error, and to reinitialize the object shape estimate at these times.

In a preferred embodiment of the invention, velocities of the visible points on the figure can be translated into rotations and translations of the figure and its limbs relative to the world coordinates, using twist mathematics. The brightness and depth constraint equations, Equations 5 and 13, can be combined as follows:

$$-\begin{bmatrix} B_t(x,y,t) \\ Z_t(x,y,t) \end{bmatrix} = \begin{bmatrix} B_x(x,y,t) & B_y(x,y,t) & 0 \\ Z_x(x,y,t) & Z_y(x,y,t) & -1 \end{bmatrix} \begin{bmatrix} v_x \\ v_y \\ v_Z \end{bmatrix} \qquad (22)$$

This formulation gives 2N equations in terms of 3N unknown motion vectors ($v_x$, $v_y$, and $v_z$ for each point) where N is the number of visible points on an articulated figure. Two of the vectors are in the image plane and the third is in the real world. In order to translate image-plane velocities into world-coordinate velocities, a camera model is employed. Using a perspective camera model and assuming that the origin of the world coordinate system is at the camera and the z-axis is along the viewing axis of the camera, so that $$x = f\frac{X}{Z}, \text{ and } y = f\frac{Y}{Z},$$

results in:

$$\begin{bmatrix} v_x \\ v_y \\ v_Z \end{bmatrix} = \begin{bmatrix} \frac{f_x}{Z} & 0 & -\frac{x}{Z} \\ 0 & \frac{f_y}{Z} & -\frac{y}{Z} \\ 0 & 0 & 1 \end{bmatrix} \begin{bmatrix} v_X \\ v_Y \\ v_Z \end{bmatrix} \qquad (23)$$

This constraint simply changes the unknown parameters. The total is still 2N equations in terms of 3N unknowns ($v_x$, $v_y$, and $v_z$ for each point).

A twist $$\xi = \begin{bmatrix} v \\ \omega \end{bmatrix},$$

is a 6-element vector with the first 3 elements, v, indirectly representing the translation and the last three elements $\omega$ representing the axis (and sometimes the amount) of rotation. As a matter of convention, if the twist is used with an explicit scaling term $\theta$, then $|\omega|=1$; otherwise, the magnitude of $\omega$ is set according to the amount of rotation. The twist can be used to form a 4×4 matrix, through the operation of the "hat operator":

$$\hat{\xi} = \begin{bmatrix} \hat{\omega} & v \\ 0 & 0 \end{bmatrix}, \text{ where } \hat{\omega} = \begin{bmatrix} 0 & -\omega_3 & \omega_2 \\ \omega_3 & 0 & -\omega_1 \\ -\omega_2 & \omega_1 & 0 \end{bmatrix}.$$

When exponentiated, this 4×4 matrix gives the rotation/translation matrix $$e^{\hat{\xi}\theta} = \begin{bmatrix} e^{\hat{\omega}\theta} & p \\ 0 & 1 \end{bmatrix}$$

where $e^{\hat{\omega}\theta}$ is the rotation and $p=((I-e^{\hat{\omega}\theta})\hat{\omega}+\omega\omega^T\theta)v$ is the translation, which maps x, y and z to v.

Using twists, the world coordinates ($q_s$) of any point on the body can be expressed as a function of time, of the point's limb number (k), of the pose parameters ($\xi_0$ and $\theta$), and of the point's limb-centric coordinates ($q_b$):

$$q_s(t)=g_{sb}(\xi_0(t),\theta(t)|k,\xi_1,\ldots,\xi_{K-1})q_b$$

where K is the number of articulated limbs in the figure. The mapping from limb-centric coordinates to world coordinates is done by translation/rotation as dictated by a "reference configuration" for the $k^{th}$ limb, $g_{sk}(0)$; by the translations/rotations $e^{\hat{\xi}_1\theta_1}\ldots e^{\hat{\xi}_{k-1}\theta_{k-1}}$ introduced by the joints along the articulated chain up to the $k^{th}$ limb; and by the translations/rotations $e^{\hat{\xi}_0}$ from the camera to the figure's torso. The parameters $\xi_1$ to $\xi_{K-1}$ define the position of each joint on the figure relative to its reference joint, e.g. the elbow relative to the shoulder, the wrist relative to the elbow, etc.

Each limb's reference configuration gives the translation and rotation from that limb's coordinate system to the world coordinate system, when the body is positioned at $\xi_0=0$ and when all of the joint angles are zero. The extra degrees of freedom given by the reference configuration simplifies the task of describing the geometry of the articulated joint locations. Given a specific pose, the transformation from the limb's coordinate frame to the world coordinate frame is:

$$g_{sb}(\xi_0(t), \theta(t)|k, \xi_1, \ldots, \xi_{K-1}) = \quad (24)$$
$$e^{\hat{\xi}_0}e^{\hat{\xi}_1\theta_1}\ldots e^{\hat{\xi}_{k-1}\theta_{k-1}}g_{sk}(0)$$

For notational simplicity hereinafter, $g_{sb}(\xi_0(t),\theta(t)|k,\xi_1,\ldots \xi_{K-1})$ will be identified as $g_{sb}$.

Using this description of the world coordinates of each body point in terms of the articulated-pose parameters, the world velocities can be related to the rotations and translations of the K coordinate frames that are tied to the K limbs of the figure. Since $q_s(t)=g_{sb}q_b$ and $q_b$ is independent of time:

$$\begin{bmatrix} v_X \\ v_Y \\ v_Z \\ 0 \end{bmatrix} = \frac{d}{dt}q_s(t) = \frac{\partial}{\partial t}g_{sb}q_b$$

$$= \left(\frac{\partial}{\partial t}g_{sb}\right)(g_{sb}^{-1}q_s(t)) = \left(\frac{\partial}{\partial t}g_{sb}g_{sb}^{-1}\right)q_s(t)$$

$$= \hat{V}_{sb}^s q_s(t)$$

The second line of the above identity is derived from the inverse of the identity $q_s(t)=g_{sb}q_b$. The third line is by definition: $\hat{V}_{sb}^s=\dot{g}_{sb}g_{sb}^{-1}$ is a 4×4 matrix describing the motion of the $k^{th}$ limb's coordinate frame relative to the world coordinate frame, in terms of world coordinates. Using $\hat{V}_{sb}^s$, a 6×1 vector, to describe this coordinate transformation makes use of the special structure $\dot{g}_{sb}g_{sb}^{-1}$. Specifically, the first three rows and columns of $\dot{g}_{sb}g_{sb}^{-1}$ are skew symmetric and the bottom row is all zeros. $q_s(t)=[q_X q_Y q_Z 1]^T$ is the homogenous world coordinates of the body point at time t. More generally, $q_X$, $q_Y$, and $q_Z$ are the coordinates of the point within a coordinate system that is tied to the world coordinate system by some known translation and rotation. Reformulating the above equation, $$\begin{bmatrix} v_X \\ v_Y \\ v_Z \end{bmatrix} = \begin{bmatrix} 1 & 0 & 0 & 0 & q_Z & -q_Y \\ 0 & 1 & 0 & -q_Z & 0 & q_X \\ 0 & 0 & 1 & q_Y & -q_X & 0 \end{bmatrix} V_{sb}^s \quad (25)$$

Hence, the X-, Y- and Z-axis motion of each point on the body is obtained by multiplying the 6 motion parameters for each limb by the matrix. At this point, each limb has been forced to be internally rigid. This reduces the number of unknown parameters down to 6 parameters per limb (the 6 elements of $V_{sb}^s$ for that limb). There are now 2N equations in terms of 6K unknowns, where K is the number of articulated limbs.

The solution is further constrained by taking advantage of the interconnections between limbs. To do this, $V_{sb}^s$ for the $k^{th}$ limb is described in terms of the articulated-pose parameters:

$$V_{sb}^s = V_{s0}^s + \sum_{i=1}^{k} J_{i-1,i}^s(\theta_i)\dot{\theta}_i \quad (26)$$

where $V_{s0}^s$ is the velocity due to the motion of the body relative to the world coordinates and the Jacobian value $J_{i-1,i}^s(\theta_i)\dot{\theta}_i$ is the velocity due to the motion of the $i^{th}$ joint along the articulated chain to the $k^{th}$ limb. Using the identity $\hat{V}_{sb}^s=\dot{g}_{sb}g_{sb}^{-1}$ provides:

$$\hat{J}_{i-1,i}^s(\theta_i) = \left(\frac{\partial}{\partial\theta_i}g_{sb}\right)g_{sb}^{-1}$$
$$= e^{\hat{\xi}_0}e^{\hat{\xi}_1\theta_1}\ldots e^{\hat{\xi}_{i-1}\theta_{i-1}}\hat{\xi}_i e^{-\hat{\xi}_{i-1}\theta_{i-1}}\ldots e^{-\hat{\xi}_1\theta_1}e^{-\hat{\xi}_0}$$

Thus, six parameters are employed for the torso, but all other limbs are reduced to one degree of freedom $\theta$ for each limb. To simplify this further, the adjoint of a rotation/translation matrix, $$g = \begin{bmatrix} R & p \\ 0 & 1 \end{bmatrix},$$

is defined as $$Adj(g) = \begin{bmatrix} R & \hat{p}R \\ 0 & R \end{bmatrix}.$$

Using this definition, $g\hat{\xi}g^{-1}=(Adj(g)\xi)^\wedge$, where $(\ )^\wedge$ means that the hat operator is applied to the vector contained within the parentheses. Using this identity, $$J_{i-1,i}^s(\theta_i)=Adj(e^{\hat{\xi}_0}e^{\hat{\xi}_1\theta_1}\ldots e^{\hat{\xi}_{i-1}\theta_{i-1}})\xi_i \quad (27)$$

The velocity due to the motion of the figure relative to the world coordinates should allow for unconstrained rotations and translations. An easy way to do this is to express these motions in terms of the 4×4 transformation matrix, instead of in terms of the twist coordinates. Let $$e^{\xi_0} = \begin{bmatrix} R_0 & P_0 \\ 0 & 1 \end{bmatrix}.$$

Then:

$$\hat{V}^s_{s0} = \left(\frac{d}{dt} e^{\xi_0}\right) e^{-\xi_0}$$

$$= \begin{bmatrix} \dot{R}_0 R_0^T & -\dot{R}_0 R_0^T p_0 + \dot{p}_0 \\ 0 & 0 \end{bmatrix}$$

This constraint is linear in terms of the unknowns ($\dot{R}_0$ and $\dot{p}_0$) but it is not tightly constrained. $\dot{R}_0$ has 9 unknowns, instead of the 3 unknowns that can be used to describe a rotation or its derivative. This over-parameterization is corrected by noting that the first 3 rows/columns of $\hat{V}^s_{s0}$ must be skew symmetric. To capture this structure, the rotational component of the frame velocity is defined as $\omega^v_0 = V^s_{s0,} = (R_0 R_0^T)^V$ where $(\ )^V$ is the inverse of the hat operator on the skew-symmetric matrix contained within the parentheses.

It is significant to note that this is not a "small angle approximation" such as is often used for mapping a rotation matrix down onto its rotation axis. The identity $\omega^v_0 = (R_0 R_0^T)^V$ is exact. The difference is that there is a special structure embedded in the derivative of a rotation matrix. The only way that an orthonormal matrix can transform into another orthonormal matrix is structured so that the derivative matrix times the transpose of the orthonormal matrix is a skew-symmetric matrix.

Substituting and rearranging, the velocity of the torso is mapped back to the twists, with six degrees of freedom, as follows:

$$V^s_{s_0} = \begin{bmatrix} I & \hat{p}_0 \\ 0 & I \end{bmatrix} \begin{bmatrix} \dot{p}_0 \\ \omega_{v_0} \end{bmatrix} \tag{28}$$

Once an estimate is obtained for $\omega_{v_0}$ (based on 2N linear constraint equations), it is translated into an estimate for $\dot{R}_0$ by rearranging the defining equation:

$$\dot{R}_0 \hat{\omega}_{v_0} R_0^{-T} = \hat{\omega}_{v_0} R_0 \tag{29}$$

There are now 2N linear constraint equations in terms of K+5 unknowns (($\omega_{v_0}$, $\dot{p}_0$, $\dot{\theta}_1$ through $\dot{\theta}_{k-1}$) plus one auxiliary equation to remap $\omega_{v_0}$ back into $\dot{R}_0$. Thus, a modified parameter set is employed to maintain linearity during the computations, and then mapped back to the original set non-linearly.

Discrete-time approximations to the time derivatives, $\dot{R}_0$, $\dot{p}_0$, and $\dot{\theta}_{k-1}$ are then determined. A forward-difference approximation to the body-translation and joint-angle derivatives is used:

$$\dot{p}_0(t) \rightarrow p_0(t+1) - p_0(t)$$

$$\dot{\theta}_i(t) \rightarrow \theta_i(t+1) - \theta_i(t) \tag{30}$$

A forward-difference approximation to the body-rotation derivative $\dot{R}_0$ is not desirable since using this approximation destroys the orthonormal structure of the rotation matrix $R_0$. Instead, a central-difference approximation is preferred:

$$\dot{R}_0\left(t + \frac{1}{2}\right) \rightarrow R_0(t+1) - R_0(t)$$

Using this central difference approximation along with Equation 29 and a first-order linear interpolation for the half-sample delay, produces:

$$R_0(t+1) - R_0(t) = \hat{\omega}_{v_0}\left(\frac{R_0(t) + R_0(t+1)}{2}\right)$$

so that $$R_0(t+1) = \left(I - \frac{\hat{\omega}_{v_0}}{2}\right)^{-1}\left(I + \frac{\hat{\omega}_{v_0}}{2}\right) R_0(t) \tag{31}$$

Combining Equations 22, 23, 25, 26, 27, 28 and 30 again results in 2N linear constraint equations in terms of K+5 unknowns. The difference is that the unknowns are now the updated parameters $\omega_{v_0}$, $p_0(t+1)$, $\theta_1(t+1)$ through $\theta_{K-1}(t+1)$). These constraints are solved using least squares. Once that solution is obtained, Equation 31 provides the non-linear mapping from $\omega_{v_0}$ to $R_0(t+1)$.

The quality of the above constraints depends on the accuracy of the first-order Taylor-series expansion used in the brightness and depth constraints. This first-order approximation often fails on large motions. Conventionally, this type of failure is compensated by estimating the motion, warping the images according to that motion estimate and repeating. This iterative estimation approach has several drawbacks. It is computationally expensive, requiring sample interpolation of the image being warped, re-computation of its spatial derivatives, and multiple formulations and solutions of the constraint equations at each time step. It introduces interpolation errors, both in the warped image values and in the spatial derivatives. Finally, for large motions, the initial motion estimates may actually point away from the true solution. The accuracy of the constraints can be improved without iteration, without interpolation, and without recomputing spatial derivatives, by allowing the focus of expansions (FOE) of each point to shift "independently" by some integer amount, ($S_x$, $S_y$). Shifting the FOE by ($S_x$, $S_y$), the constraints become:

$$-\begin{bmatrix} B(x-S_x, y-S_y, t+1) - B(x, y, t) \\ Z(x-S_x, y-S_y, t+1) - Z(x, y, t) \end{bmatrix} + S_x \begin{bmatrix} B_x(x, y, t) \\ Z_x(x, y, t) \end{bmatrix} + \tag{32}$$

$$S_y \begin{bmatrix} B_y(x, y, t) \\ Z_y(x, y, t) \end{bmatrix} \approx \begin{bmatrix} B_x(x, y, t) B_y(x, y, t) & 0 \\ Z_x(x, y, t) Z_y(x, y, t) & -1 \end{bmatrix} \begin{bmatrix} v_x \\ v_y \\ v_Z \end{bmatrix}$$

Equation 32 treats each constraint equation as if the t+1$^{th}$ frame translated rigidly by ($S_x$, $S_y$). As long as ($S_x$, $S_y$) is integer valued, it is not necessary to interpolate the image. Since the equations assume rigid translation, there is no need to recompute the spatial derivatives of the t$^{th}$ frame (as would be required to warp the t+1$^{th}$ frame). Even though each individual constraint derived from Equation 32 acts as though the frame was rigidly translated, the set of constraints across the visible image does not have to share ($S_x$, $S_y$) values. Instead, at each pixel, a new ($S_x$, $S_y$) can be selected according to the expected shift for that pixel.

This provides the freedom to choose a distinct value ($S_x$, $S_y$) for each visible point on the figure. This could be done within the traditional iterative motion estimation framework, by estimating the motion without shifting first to get an initial hypothesis for the image motion. Using that approach, the offset dictated for each pixel is rounded by the unshifted motion estimates to the nearest integer values, and those values are used for ($S_x$, $S_y$) in Equation 32. The motion is then re-estimated according to the constraint equations generated by Equation 32. This process could be iterated as often as needed to converge to a stable motion estimate.

It is more preferable, however, to use the cross correlations between times t and t+1 of the brightness and depth images. This cross correlation is evaluated for each limb separately, allowing a small number of 2D (image plane) translations and rotations. To avoid the overhead of image interpolation, zero-order hold can be used to provide non-zero rotations of the limbs. A nominal translation/rotation is selected for each limb, based on the peak of this cross correlation.

Having selected a nominal translation/rotation of the FOEs for a limb, for each point on the limb the integer-valued offset is used for $S_x$ and $S_y$ nearest to the offset dictated by the selected translation/rotation. Again, $S_x$ and $S_y$ are preferably integers to reduce the computation and to avoid interpolation errors.

Equation 32, with Equations 23, 25, 26, 27, 28 and 30, provides N brightness and N depth constraints, which can be solved with least squares, on K+5 unknowns ($p_0$(t+1), $R_0$(t+1), and $\theta_1$(t+1) through $\theta_{K-1}$(t+1)). From that solution, Equation 31 provides the non-linear mapping from $\omega_{v_0}$ to $R_0$(t+1).

Camera-centric coordinates are preferably used in the constraint Equation 23. However, any coordinate system can be used that is offset by a known rotation/translation from the camera coordinate system for the coordinates ($q_X$, $q_Y$, $q_Z$) used in Equation 25, to eliminate bias. To improve the conditioning of the constraint equation, the centroid of the visible figure is chosen as the origin of ($q_x$, $q_y$, $q_z$).

Any orientation/translation can be used as a reference configuration $g_{sk}(0)$ in Equation 24. The following discussion explains a preferred way to use this freedom to avoid estimation errors due to cross coupling between the body position and the body rotation estimates.

Equation 28 includes cross coupling between the estimates for $\dot{p}_o$ and $\omega_{v_0}$ according to the size of $p_0$. Based on the derivations and simulations, for figures that change orientation relative to the camera, this coupling term should be present. The desirability of this coupling term is not apparent in simulations until the figure changes orientation relative to the camera. In simulations, when $p_0$ was non-zero and the figure was rotating relative to the camera, this resulted in a bias in the estimates of $\dot{p}_0$. The error resulting from this bias increases linearly over time, so its effects become more detrimental as the sequence of video images gets longer.

This bias is avoided by re-parameterizing the twists, at each time step, so that $p_0$=0. This can be done without affecting the coordinate-system origin for ($q_X$, $q_Y$, $q_Z$) by adjusting $g_{sk}(0)$, the reference configurations for the limbs (see Equation 24). This allows the conditioning of the constraints to be improved (as previously described) while still avoiding coupling.

To remove this coupling without altering the articulated figure's geometry, $$\begin{bmatrix} \omega_i \times R_0^T p_0 \\ 0 \end{bmatrix}$$

is subtracted from each internal joint $$\xi_i = \begin{bmatrix} v_i \\ \omega_i \end{bmatrix} \quad (i \geq 1).$$

(An offset of $R_0^T p_0$ is implicitly added to the last column of $g_{sk}(0)$. However, since $g_{sk}(0)$ never actually appears in the final constraint equations, this offset is more conceptual than computational.) This maintains the original geometry since, if exp $$\left( \begin{bmatrix} v_i \\ \omega_i \end{bmatrix} \theta_i \right) = \begin{bmatrix} R_i & p_i \\ 0 & 1 \end{bmatrix} \text{ then}$$

$$e^{\begin{bmatrix} v_i \theta_i - (\omega_i \theta_i \times R_0^T p_0) \\ \omega_i \theta_i \end{bmatrix}^\wedge} = \begin{bmatrix} R_i p_i + R_0^T p_0 & -R_i R_0^T p_0 \\ 0 & 1 \end{bmatrix}$$

$$= \begin{bmatrix} I & R_0^T p_0 \\ 0 & 1 \end{bmatrix} \begin{bmatrix} R_i & p_i \\ 0 & 1 \end{bmatrix} \begin{bmatrix} I & -R_0^T p_0 \\ 0 & 1 \end{bmatrix}$$

so that $$g_{so} = \begin{bmatrix} r_0 & p_0 \\ 0 & 1 \end{bmatrix} e^{\xi_1 \theta_1} \ldots e^{\xi_{k-1} \theta_{k-1}} g_{sk}(0)$$

$$= \left( \begin{bmatrix} R_0 & p_0 \\ 0 & 1 \end{bmatrix} \begin{bmatrix} I & -R_0^T p_0 \\ 0 & 1 \end{bmatrix} \right) \left( \begin{bmatrix} I & R_0^T p_0 \\ 0 & 1 \end{bmatrix} e^{\xi_1 \theta_1} \begin{bmatrix} I & -R_0^T p_0 \\ 0 & 1 \end{bmatrix} \right) \ldots$$

$$\left( \begin{bmatrix} I & R_0^T p_0 \\ 0 & 1 \end{bmatrix} e^{\xi_k \theta_k} \begin{bmatrix} I & -R_0^T p_0 \\ 0 & 1 \end{bmatrix} \right) \left( \begin{bmatrix} I & R_0^T p_0 \\ 0 & 1 \end{bmatrix} g_{zb}(0) \right)$$

$$= \begin{bmatrix} R_0 & 0 \\ 0 & 1 \end{bmatrix} e^{\begin{bmatrix} \xi_i \theta_i - (\omega_i \theta_i \times R_0^T p_0) \\ \omega_i \theta_i \end{bmatrix}^\wedge} e^{\begin{bmatrix} \xi_{k-1} \theta_{k-1} - (\omega_{k-1} \theta_{k-1} \times R_0^T p_0) \\ \omega_{k-1} \theta_{k-1} \end{bmatrix}}$$

$$\left( g_{sb}(0) + \begin{bmatrix} 1 & R_0^T p_0 \\ 0 & 0 \end{bmatrix} \right)$$

When these transformations are used to remove the cross-coupling between $\dot{p}_0$ and $\omega_{v_0}$, $\dot{p}_0$ also needs to be transformed back to the original coordinate system. This is done by setting $p_0(t_1) = \dot{p}_0 + R_0(t+1)R_0^T(t)p_0(t)$.

In accordance with a second aspect of the invention, the dense depth data can be employed in conjunction with a shape model to estimate the pose of an articulated figure. As in the previous approach which employs the constraint equations, a figure is tracked by incrementally estimating its pose at regular intervals, e.g. for each video frame. In other words, sequential state estimation is employed to obtain the figure's pose.

State estimation is the process of determining a set of parameters for a given model that best accounts for a set of observations within the realm of that which can be expected. More specifically, the state estimation finds the most probable sequence of states given a set of observations and a set of expectations, in other words the sequence of states with the maximum a posteriori probability. However, since real image data attained from the video cameras are subject to noise and occlusions, the observations will generally have some erroneous or missing elements. In order to alleviate the effects of these imperfections on the results, the process of maximizing the agreement of the observations with a model is refined by considering a priori expectations, such as smooth motions or bounded accelerations or velocities. As a result, the process is generalized to minimizing a residual, where the residual takes into the account the agreement or correlation of a proposed state with the observations, as well as some measure of the unexpectedness or innovation of the proposed state, based on past history.

Figure 2:
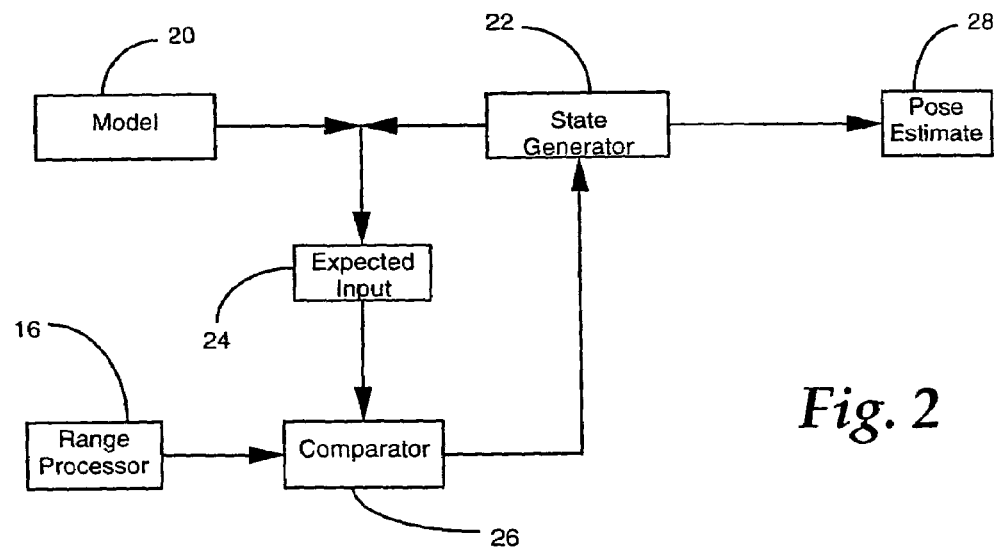
FIG. 2 is a block diagram of an image processor in accordance with one aspect of the invention.

A more detailed block diagram of the image processing portion of the system for estimating pose of an articulated figure in accordance with this aspect of the invention is illustrated in FIG. 2. A model 20 is constructed for the figure whose pose is to be estimated. A state generator 22 produces a hypothesis for the pose, or state, which is applied to the model to generate an expected input 24. This expected input is compared with the actual input, i.e. the dense depth data from the range processor 16, in a comparator 26. The errors between the expected input and the actual input are then applied to the state generator 22. A new hypothesized state is then generated, in an effort to reduce the error. This process continues in a recursive manner, until the residual error has been minimized. At this point, a set of output parameters 28 are produced, as an estimate of the figure's pose.

Figure 3A:
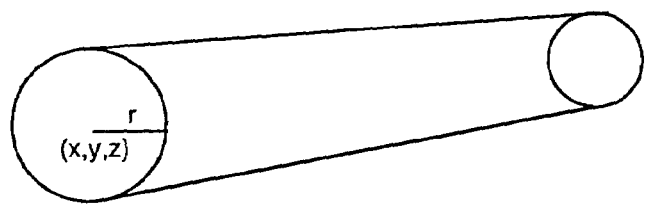
FIGS. 3a and 3b are illustrations of a planar patch model for a single segment and two articulated segments of a figure, respectively.
Figure 3B:
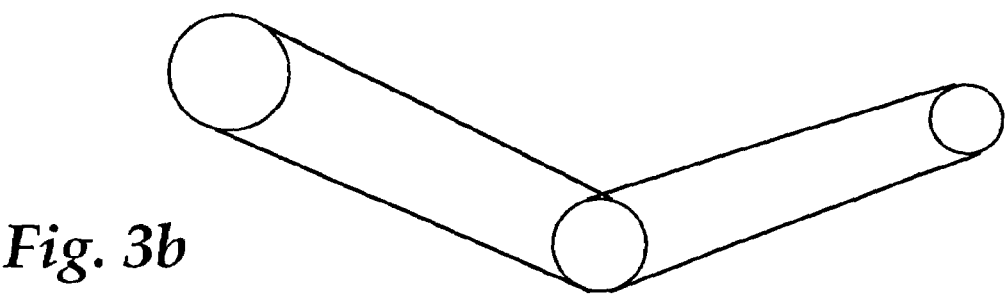

The model 20 consists of a set of connected planar patches, each of which is in the shape of the convex hull of two circles. FIG. 3a illustrates one such patch, which corresponds to a segment of the figure, e.g. a limb. The radius (r) and three-dimensional location (x,y,z) of each circle are variable parameters, which are estimated by the state generator 22. The connectivity of the patches is fixed, and provided by the user. For example, FIG. 3b illustrates two patches that respectively correspond to two limbs that share a common joint, e.g. the upper arm and forearm of a person. At the joint, the circles of the two patches coincide in the two-dimensional image plane of the camera 12a.

The visible surface of each articulated segment of the figure is modeled by a single patch, such as that shown in FIG. 3a. Each surface patch $S_k=S_{(ij)}$, and is defined by two nodes $n_i$, $n_j$ at its ends. Each node is specified by four scalar values $(x_i, y_i, z_i, r_i)$, which indicate its location and size. Given the values for two adjacent nodes $n_i$ and $n_j$, the connecting model patch $S_{(ij)}$ is a region of a plane with a range map $R_{(ij)}$ that passes through the two points $(x_i, y_i, z_i)$ and $(x_j, y_j, z_j)$ but is otherwise parallel to the image plane. Thus, for each segment of the figure, there corresponds a windowed depth map. The set of these maps over all segments $S_k$, where k ranges over the pairs (i,j) for which a segment exists, forms the complete state estimate against which the dense depth data from the processor 16 is compared.

Figure 4:
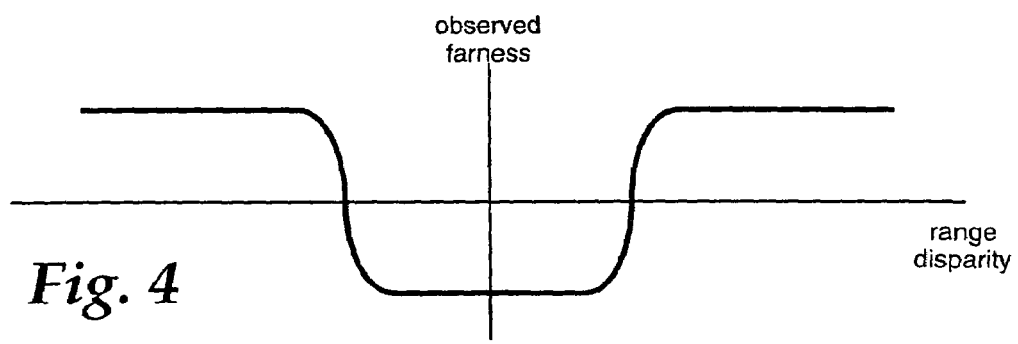
FIG. 4 is a graph depicting the function for observed farness.

Within the comparator 26, a determination is made for each pixel u of each segment $S_k$, of the correlation between the observed and expected inputs. This correlation is based the difference between the range I(u) that is observed on the actual input for the pixel, and the range $R_k(u)$ that is predicted by the segment. Since there are likely to be errors in both the measurement and the model, the magnitude of the difference is compared against a finite threshold. Pixels whose difference values lie above or below the threshold are respectively identified as being far from or close to the surface. FIG. 4 illustrates an example of a threshold function for observed farness. In this case, a pixel which lies within the threshold, and is therefore considered to be close to the surface, is assigned an observed farness value of –1, whereas pixels which are far from the surface have a value of +1.

Figure 5:
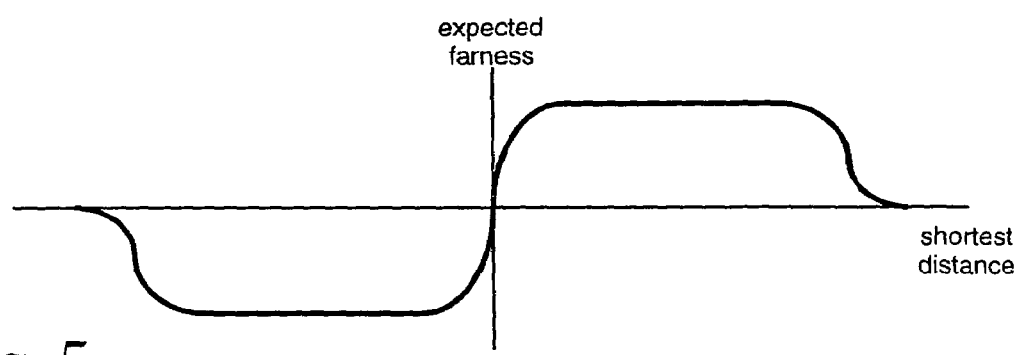
FIG. 5 is a graph depicting the function for expected farness.

Since the surface patches of the model are planar, they have a uniform range across their widths, i.e., in a direction perpendicular to an axis intersecting the two nodes. However, for many three-dimensional objects, the measured range will vary across the width of the object, due to its thickness. This discrepancy could result in erroneous correlation results. Therefore, as a second measure, the correlation between the observed input and the estimated input is confined to an area near the boundary of a segment. A true segment boundary has pixels of the segment inside the boundary, and pixels pertaining to other structure outside the boundary. Hence, the depth value for pixels that are just inside the boundary should fit the segment model, and the depth of pixels just outside the boundary would not be expected to fit the model. FIG. 5 illustrates a function that can be employed for the expected farness of a pixel, based on these considerations. The abscissa of this graph represents the shortest distance from the pixel of interest (u) to the boundary of the segment. Hence, pixels which lie just outside the boundary have an expected farness value of +1, and those which lie just inside the boundary have an expected farness value of –1. The function goes to 0 at a predetermined distance from the boundary, since only those pixels which are relatively close to the boundary are of interest.

The correlation between the observed depth data and the expected state therefore comprises a sum over all segments, and over all pixels of a segment, of the observed farness and the expected farness.

To determine the estimate, the state generator 22 selects the set of two-dimensional parameters $(x_i, y_i, r_i)$ for which the difference between the observed and estimated depth values, summed over all of the pixels for all of the figure segments, is a minimum. Preferably, this minimum is determined by using a least squares fit. The various hypotheses can be generated, for example, by starting with the state that was estimated for the previous frame, and then proposing new hypothesized states which have configurations that are close to those of the previous estimate. Since the pose estimates are updated at a fairly high rate, e.g., video frame rates, the object of interest is not expected to change size or position significantly from one estimate to the next. This can be taken into account during the generation of new hypotheses, by weighting those which are closest to the most recent estimate as more likely than those which are farther away.

Figure 6:
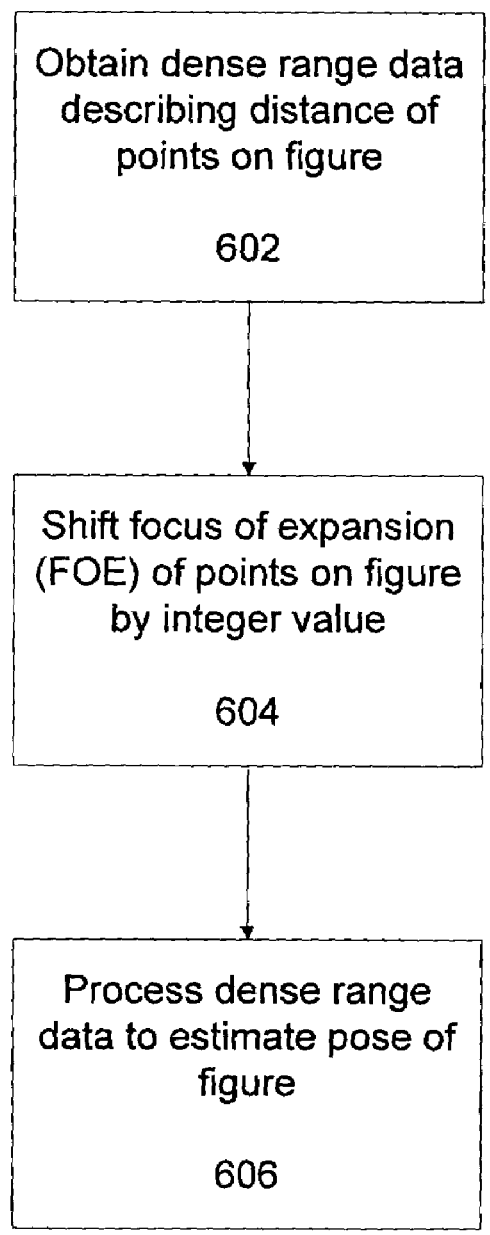
FIG. 6 illustrates a method for estimating the pose of an articulated figure, in accordance with an embodiment of the invention.

FIG. 6 illustrates a method for estimating the pose of an articulated figure, in accordance with an embodiment of the invention. In this example, dense range data is obtained that describes the distance of points on a figure from a reference point (602). A focus of expansion (FOE) of the points on the figure is shifted by an integer value or amount in order to improve the accuracy of a constraint (depth or otherwise) (604). The dense range data is processed to estimate the pose of the figure (606).

From the foregoing, therefore, it can be seen that the present invention provides a mechanism for estimating the pose of an object from dense depth data. Of particular significance, the techniques of the present invention can be employed to estimate the pose of articulated objects, as well as solid objects. In one approach, the pose is estimated on the basis of the depth data alone, through the use of a model consisting of planar patches. A second approach dispenses with the need for a model, by using both depth and brightness data, in conjunction with appropriate constraint equations.

It will be appreciated by those of ordinary skill in the art that the present invention can be embodied in other specific forms without departing from the spirit or essential characteristics thereof. The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A method for estimating the pose of an articulated figure, comprising the steps of:
    obtaining dense range data which describes the distance of points on the figure from a reference;
    shifting a focus of expansion of a point on the figure independently by an integer value; and
    processing said dense range data to estimate the pose of the figure;
    wherein said dense range data is compared with an estimate of pose to produce an error value and said estimate is iteratively revised to minimize said error and wherein the estimate of pose is generated with reference to a model of the figure.

2. The method of claim 1 wherein the dense range data is processed in accordance with a set of depth constraints to estimate the pose.

3. The method of claim 2 wherein said depth constraints are linear.

4. The method of claim 2 wherein said depth constraints are represented by means of twist mathematics.

5. The method of claim 1 wherein said model comprises a set of planar patches which respectively correspond to segments of the articulated figure.

6. The method of claim 5 wherein each patch comprises the convex hull of two circles.

7. The method of claim 1, wherein shifting the focus of expansion improves an accuracy of a constraint.

8. A method for estimating the pose of an object, comprising the steps of:
    obtaining dense range data which describes the distance of points on the object from a reference;
    shifting a focus of expansion of a point on the object independently by an integer value; and
    processing said dense range data in accordance with a set of linear depth constraints to estimate the pose of the object;
    wherein said dense range data is compared with an estimate of pose to produce an error value and said estimate is iteratively revised to minimize said error and wherein the estimate of pose is generated with reference to a model of the object.

9. The method of claim 8 wherein the object is articulated.

10. The method of claim 9 wherein said depth constraints are represented by means of twist mathematics.

11. The method of claim 10 further including the steps of mapping parameters which describe rotation and translation of the object to a set of linear parameters, solving for the depth constraints, and re-mapping back to the original parameters to provide a pose estimate.

12. The method of claim 9, wherein said reference comprises a location on the object, and the pose is estimated, at least in part, from the positions of points on the object relative to said location.

13. The method of claim 9, wherein an estimate of the pose of the object includes an estimate for each of the orientation and translational positions of the object, and further including the steps of decoupling the estimate of orientation from the estimate of translational position.

14. The method of claim 8, wherein the pose of the object is estimated for each image in a sequence of images, and further including the step of selecting a rigid translation value for each point on the object from one image to the next.

15. The method of claim 14, wherein said rigid translation value is an integer value.

16. The method of claim 14, wherein the rigid translation values are different for different points on the object.

17. A method for estimating the pose of an articulated object appearing in a sequence of video images, comprising the steps of:
    establishing a model for the surfaces of the articulated object;
    obtaining dense range data for pixels in each of said video images;
    shifting a focus of expansion of a point on the object independently by an integer value;
    generating a hypothetical pose for the object and determining the correlation of the hypothetical pose to the range data for an image; and
    recursively generating successive hypothetical poses and determining the correlation of each hypothetical pose to identify the pose having the closest correlation to the range data.

18. The method of claim 17, wherein the estimate of pose is generated with reference to a model of the object.

19. The method of claim 18, wherein said model comprises a set of planar patches which respectively correspond to segments of the articulated object.

20. The method of claim 18, wherein the correlation is determined with respect to pixels in an image that are located within a predetermined distance of edges of said planar patches.

* * * * *

UNITED STATES PATENT AND TRADEMARK OFFICE
CERTIFICATE OF CORRECTION

| | | |
|---|---|---|
| PATENT NO. | : 7,158,656 B2 | Page 1 of 1 |
| APPLICATION NO. | : 11/195039 | |
| DATED | : January 2, 2007 | |
| INVENTOR(S) | : Michele M. Covell | |

It is certified that error appears in the above-identified patent and that said Letters Patent is hereby corrected as shown below:

<u>Title Page</u>, (75)
Inventors: "Michael Hongmal Lin, Stanford, CA (US);" should be --Michael Hongmal Lin, Menlo Park, CA (US);--

Signed and Sealed this

Third Day of July, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,158,656 B2 | Page 1 of 1 |
| APPLICATION NO. | : 11/195039 | |
| DATED | : January 2, 2007 | |
| INVENTOR(S) | : Michele M. Covell | |

It is certified that error appears in the above-identified patent and that said Letters Patent is hereby corrected as shown below:

Title Page, (75)
Inventors: "Michael Hongmai Lin, Stanford, CA (US);" should be
--Michael Hongmai Lin, Menlo Park, CA (US);--

This certificate supersedes Certificate of Correction issued July 3, 2007.

Signed and Sealed this

Second Day of October, 2007

JON W. DUDAS
*Director of the United States Patent and Trademark Office*